No. 737,652. PATENTED SEPT. 1, 1903.
E. T. McKAIG.
POWER TRANSMITTER.
APPLICATION FILED JAN. 26, 1903.
NO MODEL. 2 SHEETS—SHEET 1.
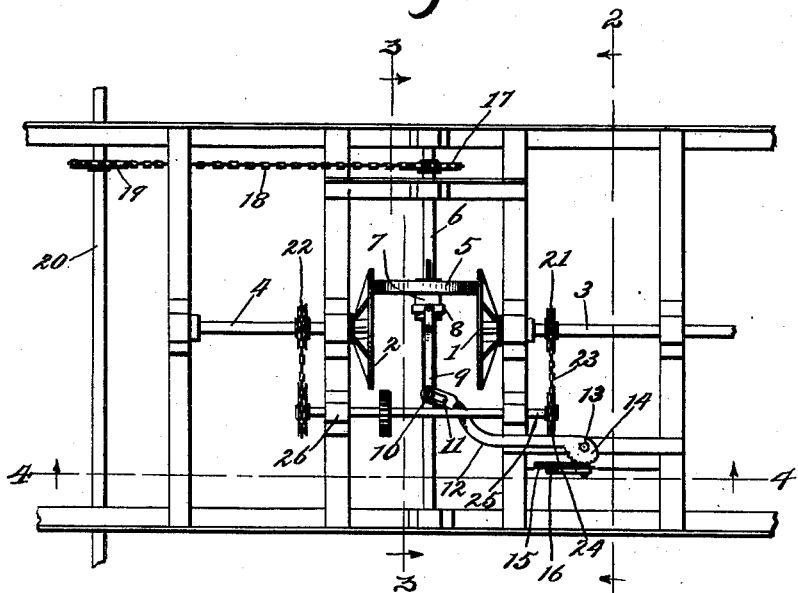
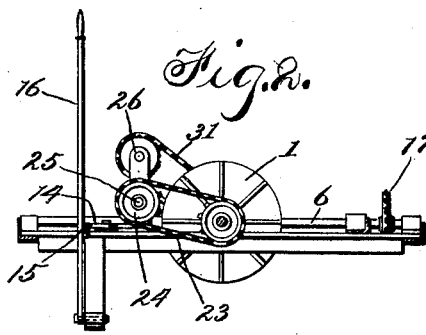
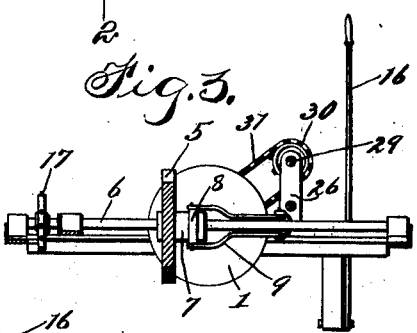
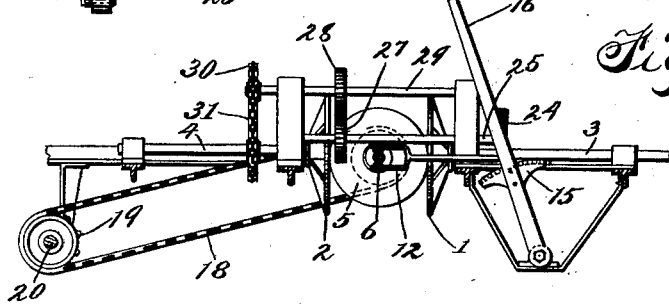
Witnesses:
J. B. Weir
Ira D. Perry
Inventor:
E. T. McKaig
by Elliott Hopkins
Atty No. 737,652. PATENTED SEPT. 1, 1903.
E. T. McKAIG.
POWER TRANSMITTER.
APPLICATION FILED JAN. 26, 1903.
NO MODEL. 2 SHEETS—SHEET 2.
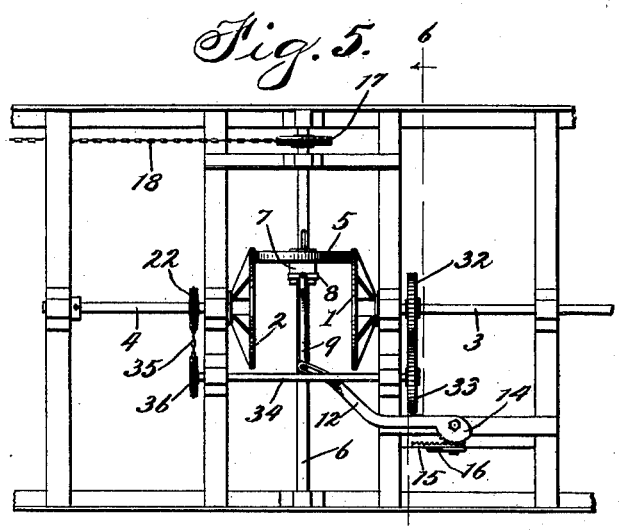
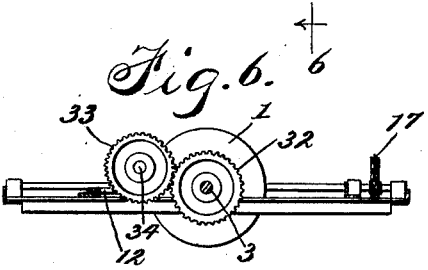
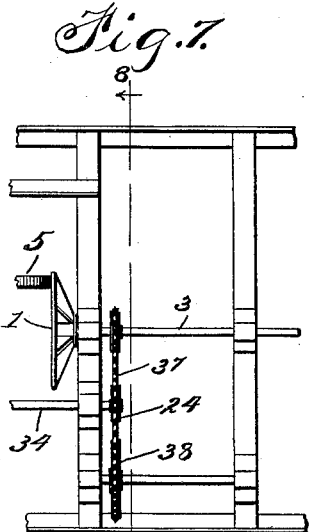
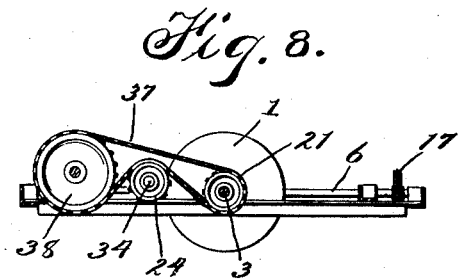
Witnesses:
J B Weir
Ira D. Perry
Inventor:
E. T. McKaig
by Elliott & Hopkins
Attys No. 737,652. Patented September 1, 1903.

UNITED STATES PATENT OFFICE.

EDDY T. McKAIG, OF CHICAGO, ILLINOIS.

POWER-TRANSMITTER.

SPECIFICATION forming part of Letters Patent No. 737,652, dated September 1, 1903.

Application filed January 26, 1903. Serial No. 140,595. (No model.)

*To all whom it may concern:*

Be it known that I, EDDY T. McKAIG, a citizen of the United States, residing at Chicago, in the county of Cook and State of Illinois, have invented certain new and useful Improvements in Power-Transmitters, of which the following is a full, clear, and exact specification.

My invention relates to that class of power-transmitters in which the power is transmitted from two opposed driving-disks to a friction-pulley presenting its periphery to the faces of the disks and movable thereacross, and my invention has for its primary object to transfer the motion of one disk to the other in the reverse direction without using direct gear-wheels between them, as the gears are necessarily large, expensive, heavy, and noisy.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a plan view of my improved power-transmitter. Fig. 2 is a cross-section thereof taken on the line 2 2, Fig. 1. Fig. 3 is a similar section on the line 3 3, Fig. 1. Fig. 4 is a longitudinal section on the line 4 4, Fig. 1. Fig. 5 is a view similar to Fig. 1, illustrating a modification hereinafter described. Fig. 6 is a cross-section on the line 6 6, Fig. 1. Fig. 7 is a fragmentary plan view of a still further modified form; and Fig. 8 is a cross-section thereof on the line 8 8, Fig. 7.

1 2 are the aforesaid disks which are suitably secured to shafts 3 4, respectively, and arranged opposite each other with their shafts in axial alinement, and 5 is the aforesaid friction-pulley arranged between disks 1 and 2, with its periphery presented to the faces of both, so as to be engaged on opposite sides by the disks, and thus caused to rotate on an axis at right angles to the shafts 3 and 4. The pulley 5 is splined on a transverse shaft 6, as usual, and may be provided with the usual or any suitable means whereby it is caused to move along its shaft 6 from side to side of the disks and directly or substantially across their centers. As an example of a suitable means for accomplishing this, the hub 7 of the disk is provided with a loose collar 8, to which is attached a yoke 9, having one end provided with a pin 10, running in a slot 11 of a bifurcated lever 12, which is pivoted at 13 and provided with a toothed segment 14, engaged by a toothed segment 15 on any suitable operating-lever 16, so that when lever 16 is oscillated or moved back and forth the pulley 5 will be caused to move toward or from the centers of the disks 1 2. The power derived from the rotation of the pulley 5 may be transmitted to the shaft-axle or other member where it is desired for use by any suitable means. In the drawings I have shown the shaft 6 provided with a sprocket 17, which is connected by chain 18 to a sprocket 19 on an axle or shaft 20, which would be the preferable arrangement when the power-transmitter is used on an automobile or the like. The power of the pulley 5 being dependent solely upon friction, it is necessary in the practicable application of power-transmitters of this type to have both of the disks 1 2, as well as the pulley 5, of considerable diameter, and hence direct gearing or cog-wheels between these disks for transmitting the motion of one to the other in the reverse direction is not feasible for reasons before mentioned, and hence in order that the motion of the shaft 3, which may be regarded as the engine-shaft or driving-shaft, may be transferred to the shaft 4 in the reverse direction, so that the pulley 5 will be driven from both sides and the pressure of the disks against its bearing neutralized, I employ a motion transmitting and reversing mechanism extending around said disks from their outer sides, so that their inner sides or opposed faces will be absolutely free and unobstructed for the movement of the pulley 5. There are various forms of power transmitting and reversing mechanisms that might be employed for accomplishing this without using large gears, which, as before explained, are not only expensive and heavy but are noisy. A desirable form is that which is shown in Figs. 1 to 4 of the drawings. In this form each of the shafts 3 4 is provided with a sprocket-wheel, these being shown at 21 22, respectively, and the sprocket 21 on shaft 3 is connected by chain 23 to a sprocket 24 on a counter-shaft 25, journaled in the lower ends of standards 26 and carrying a spur-gear 27, fixed thereon, which gear engages a spur-gear 28 on another counter-shaft 29, mounted at or near the upper ends of standards 26, and having a sprocket 30, which is connected by chain 31 to the sprocket 22, thus transmitting the motion of shaft 3 to shaft 4 and reversing its direction by virtue of gears 27 28, which are always in mesh and may be comparatively small pinions.

In the form of my invention shown in Fig. 5 shaft 3 is provided with a pinion 32, which engages a companion pinion 33, mounted on counter-shaft 34, which is the same as counter-shaft 25, excepting that it is connected directly with the sprocket 22 on the shaft 4 by chain 35 and the sprocket-wheel 36, the latter being secured to shaft 34.

In the further modification illustrated in Figs. 7 and 8 I transfer the motion of shaft 3 to the counter-shaft 34 and reverse its direction by means of a belt or chain 37 passing around the sprocket 21 on shaft 3 and thence over sprocket 24 on shaft 34 and around an idler 38, which is for the purpose of carrying one end of belt 37 and holding one fold of the belt against the side of sprocket 24. Shaft 34 in this form is connected to shaft 4 by the means described with reference to Fig. 5.

Having thus described my invention, what I claim as new therein, and desire to secure by Letters Patent, is—

1. In a power-transmitter, the combination of two opposed driving-disks, a driven pulley presenting its periphery to said disks and arranged between them in contact therewith, a counter-shaft, an idler, a wheel on said counter-shaft, a belt operatively connected with one of said disks and passing against said wheel and around said idler, for imparting motion to said counter-shaft in the reverse direction of the last said one of said disks, and means for transmitting the motion of said counter-shaft to the other one of said disks.

2. In a power-transmitter the combination of two opposed driving-disks, a driven pulley presenting its periphery to said disks and arranged between them, a counter-shaft, means for driving said counter-shaft in unison with one of said disks but in the reverse direction and means for transferring the motion of said counter-shaft to the other one of said disks, substantially as set forth.

3. In a power-transmitter the combination of two opposed driving-disks, a driven pulley presenting its periphery to said disks and arranged between them, a counter-shaft, means for driving said counter-shaft in unison with one of said disks, a second counter-shaft geared to said first shaft and means operatively connecting said second shaft with the other one of said disks, substantially as set forth.

EDDY T. McKAIG.

Witnesses:
F. A. HOPKINS,
JNO. G. ELLIOTT.